(12) United States Patent
Abe et al.

(10) Patent No.: US 8,789,666 B2
(45) Date of Patent: Jul. 29, 2014

(54) FRICTION COUPLE

(75) Inventors: Kenji Abe, Toyota (JP); Masaaki Nishiwaki, Mishima (JP); Hiroshi Isono, Mishima (JP); Yukihiro Shiomi, Susono (JP); Hiroyuki Fujikawa, Nagoya (JP); Satoshi Wakamatsu, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 520 days.

(21) Appl. No.: 13/123,596

(22) PCT Filed: Oct. 9, 2009

(86) PCT No.: PCT/IB2009/007079
§ 371 (c)(1),
(2), (4) Date: Dec. 5, 2011

(87) PCT Pub. No.: WO2010/041133
PCT Pub. Date: Apr. 15, 2010

(65) Prior Publication Data
US 2012/0085605 A1    Apr. 12, 2012

(30) Foreign Application Priority Data
Oct. 10, 2008    (JP) .................................. 2008-263933

(51) Int. Cl.
*F16D 69/02*    (2006.01)
(52) U.S. Cl.
USPC ..................................................... 188/251 A
(58) Field of Classification Search
USPC ..................... 188/73.1, 251 A, 250 R, 251 M
See application file for complete search history.

(56) References Cited

U.S. PATENT DOCUMENTS 2,686,140 A * 8/1954 Gaugue, Jr. ............... 188/250 R
3,585,102 A * 6/1971 Burgess ......................... 428/147
(Continued)

FOREIGN PATENT DOCUMENTS

EP    0 897 675    2/1999
EP    1 564 245    8/2005
(Continued)

OTHER PUBLICATIONS

Espacnet Machine Translation of JP08-109937 A.*
(Continued)

*Primary Examiner* — Anna Momper
(74) *Attorney, Agent, or Firm* — Oblon, Spivak, McClelland, Maier & Neustadt, L.L.P.

(57) ABSTRACT

A friction couple including a frictionally rubbing member that contains at least one of a binder and a filler, in which the binder and the filler have a modulus of elasticity of 1 GPa or higher and 15 GPa or lower, no softening point or no glass transition point in the range of −50° C. or higher and 200° C. or lower, and a compressive strength of 50 MPa or higher at 25° C. and 25 MPa or higher at 200° C.; and a frictionally rubbed member. The ratio of the maximum value tan δ(Max) to the minimum value tan δ(Min) of the loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming is 5 or less.

10 Claims, 4 Drawing Sheets

(56) References Cited

U.S. PATENT DOCUMENTS

| | | | |
|---|---|---|---|
| 4,351,885 A * | 9/1982 | Depoisier et al. | 428/544 |
| 4,777,193 A | 10/1988 | Kani | |
| 5,098,758 A | 3/1992 | Kani | |
| 8,025,134 B2 * | 9/2011 | Foge et al. | 188/251 A |
| 2002/0160131 A1 | 10/2002 | Ohira et al. | |
| 2005/0025883 A1 * | 2/2005 | Yuan et al. | 427/180 |

FOREIGN PATENT DOCUMENTS

| | | |
|---|---|---|
| JP | 5 62916 | 9/1993 |
| JP | 08109937 A * | 4/1996 |
| WO | 2006 006508 | 1/2006 |

OTHER PUBLICATIONS

Ma et al., "Effects of ZrSiO4 in non-metallic brake friction materials on friction performance", Tribology Inernational, 41, p. 166-187, Published Aug. 29, 2007.*

International Search Report issued Jan. 26, 2010 in PCT/IB09/07079 Oct. 9, 2009.

Database WPI Week 200613. Thomson Scientific, London, GB; AN 2006-125352, XP002563924.

* cited by examiner

F I G . 1
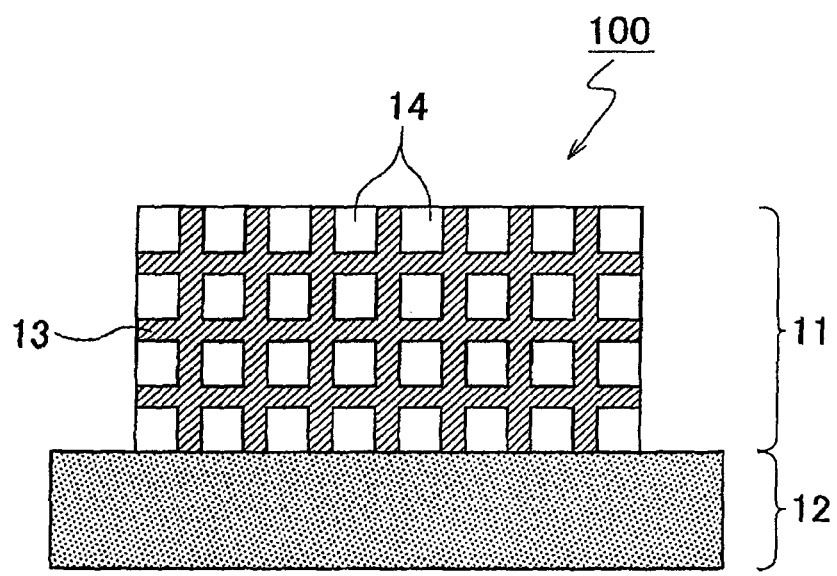

FRICTION COUPLE

BACKGROUND OF THE INVENTION

1. Field of the Invention

The present invention relates to a friction couple that can suppress variations in a friction force.

2. Description of the Related Art

Friction members according to the related art for use as a sliding member for clutches or brakes for automobiles, machine tools, and so forth contain a thermosetting resin, such as a phenol resin, as a binder. The thermosetting resin is occasionally decomposed or melted into low-molecular materials when it is subjected to friction, which adversely affects the noise and vibration characteristics of the friction member.

A friction member that contains a polyimide resin in place of the thermosetting resin that is described above is disclosed. Japanese Patent Publication No. 5-62916 discloses a polyimide-based friction member obtained by thermocompression molding of a polyimide-based composition that has an aromatic polyimide resin.

The friction member which contains a polyimide resin disclosed in Japanese Patent Publication No. 5-62916 has excellent heat resistance. When the temperature exceeds a level at which the resin is decomposed during a braking operation under a high load, however, a low-molecular gas may be produced during decomposition and temporarily press back a brake pad or the like to reduce the friction coefficient, which causes a so-called "brake fade". The polyimide-based composition disclosed in Japanese Patent Publication No. 5-62916, or specifically its aromatic polyimide resin powder, contains fluorine resin powder, which is occasionally used as a lubricant. Because of the brake fade due to the polyimide resin and the low friction coefficient of the fluorine resin, it is considered to be difficult to suppress a reduction in the friction coefficient during the occurrence of the brake fade.

SUMMARY OF THE INVENTION

The present invention provides a friction couple capable of suppressing variations in a friction force.

A friction couple according to an aspect of the present invention includes: a frictionally rubbing member that contains at least one of a binder and a filler, in which the binder and the filler have a modulus of elasticity of 1 GPa or higher and 15 GPa or lower, no softening point or no; glass transition point in the range of −50° C. or higher and 200° C. or lower, and a compressive strength of 50 MPa or higher at 25° C. and 25 MPa or higher at 200° C.; and a frictionally rubbed member, in which a friction surface of the frictionally rubbing member and a friction surface of the frictionally rubbed member contact each other when the frictionally rubbing member and the frictionally rubbed member are combined with each other, in which a maximum value tan δ(Max) and a minimum value tan δ(Min) of a loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming have a relationship tan δ(Max)/tan δ(Min)≤5 (equation (1)).

According to the friction couple which is configured as described above, the frequency dependency of the loss tangent tan δ of the frictionally rubbing member is low as indicated by the equation (1). Therefore, the conformability of the friction surface of the frictionally rubbing member to the friction surface of the frictionally rubbed member is high, which makes it possible to suppress generation of vibration in the initial stage of generation of a friction force. In the above aspect of the present invention, also, the at least one of the binder and the filler in the frictionally rubbing member has an appropriate modulus of elasticity. This allows the frictionally rubbing member to absorb variations in the friction force in minute regions that are produced by the friction, which can suppress generation of vibration in the initial stage of generation of the friction force. In the above aspect of the present invention, further, the at least one of the binder and the filler in the frictionally rubbing member has no softening point or no glass transition point in a certain temperature range. This prevents the at least one of the binder and the filler in the frictionally rubbing member from being modified from an amorphous state into a rubber state during friction. This allows the formation of a stable friction surface. In the above aspect of the present invention, moreover, the at least one of the binder and the filler has a moderate compressive strength at room temperature, and half the compressive strength at room temperature or higher even at 200° C. This allows the formation of a friction surface that is stable before, during, and after friction. According to the above aspect of the present invention, furthermore, it is possible to suppress variations in the friction force through the addition of a minimum necessary amount of the binder and/or the filler.

In the above aspect, a recess may be formed in at least one of the respective friction surfaces of the frictionally rubbing member and the frictionally rubbed member, and at least one of an inorganic material and a metallic material coated with at least one of the binder and the filler may be provided in the recess.

According to the friction couple which is configured as described above, the at least one of the binder and the filler absorbs vibration of the inorganic material and/or the metallic material in the recess, which can suppress generation of noise and vibration.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein;

FIG. 1 is a schematic cross-sectional view that shows a friction couple according to an embodiment of the present invention;

DETAILED DESCRIPTION OF EMBODIMENTS

A friction couple according to an embodiment of the present invention includes: a frictionally rubbing member that contains at least one of a binder and a filler, in which the binder and the filler have a modulus of elasticity of 1 GPa or higher and 15 GPa or lower, no softening point or no glass transition point in the range of −50° C. or higher and 200° C. or lower, and a compressive strength of 50 MPa or higher at 25° C. and 25 MPa or higher at 200° C.; and a frictionally rubbed member, in which a friction surface of the frictionally rubbing member and a friction surface of the frictionally rubbed member contact each other when the frictionally rubbing member and the frictionally rubbed member are combined with each other, in which a maximum value tan δ(Max) and a minimum value tan δ(Min) of a loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming have a relationship tan δ(Max)/tan δ(Min)≤5 (equation (1)).

In the friction couple according to an embodiment of the present invention, the frictionally rubbing member may be configured to contain at least one of the binder and the filler in at least a part of the friction surface that contacts the frictionally rubbed member.

In the embodiment of the present invention, the term "frictionally rubbed member" does not specifically mean that it is frictionally rubbed by the frictionally rubbing member. Thus, in the case where a friction couple is formed by a pad and a rotor, for example, the pad may serve as the "frictionally rubbing member" and the rotor may serve as the "frictionally rubbed member" in some cases, or the rotor may serve as the "frictionally rubbing member" and the pad may serve as the "frictionally rubbed member" in other cases.

In a friction couple that includes a frictionally rubbing member and a frictionally rubbed member, in general, the pressures of respective friction surfaces of the frictionally rubbing member and the frictionally rubbed member vary because of minute recesses and projections on the respective friction surfaces of the frictionally rubbing member and the frictionally rubbed member, recesses and projections on the friction surface of the frictionally rubbed member due to adhesion of the frictionally rubbing member to the frictionally rubbed member, variations in a friction force that is applied to the friction surface of the frictionally rubbing member in minute regions on the friction surface of the frictionally rubbed member, and so forth. Such variations in the surface pressures cause the frictionally rubbing member to vibrate and resonate with the frictionally rubbed member, which produces noise and vibration.

Figure 5:
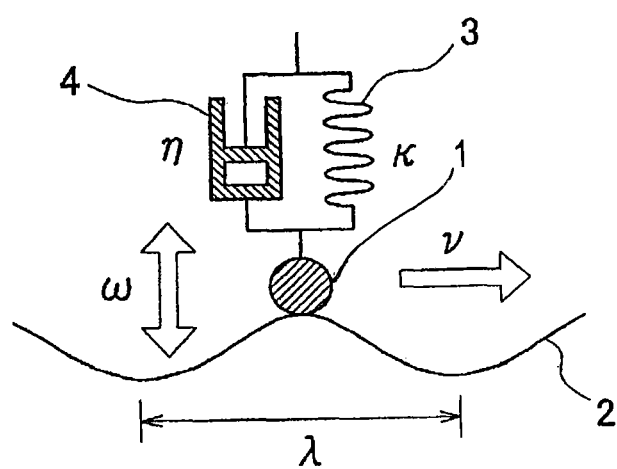
FIG. 5 is a schematic cross-sectional view that shows how a mass ball on a friction surface of a frictionally rubbing member is vibrated by recesses and projections on a friction surface of a frictionally rubbed member.

FIG. 5 is a schematic cross-sectional view that shows how a mass ball on a friction surface of a frictionally rubbing member is vibrated by recesses and projections on a friction surface of a frictionally rubbed member. A mass ball 1 is a ball that has a mass m and that forms a part of the friction surface of the frictionally rubbing member. It is assumed that the mass ball 1 moves on a friction surface 2 of the frictionally rubbed member at a speed v (=dx/dt) in a horizontal direction with respect to the direction in which the sheet surface of FIG. 5 extends. The mass ball 1 is assumed to be made of a material with a high friction coefficient, for example. For the purpose of convenience, the friction surface 2 of the frictionally rubbed member has the shape of a sine wave. The viscoelasticity of the at least one of the binder and the filler contained in the frictionally rubbing member is represented by a circuit in which a spring 3 and a dashpot 4 are connected in parallel to each other and which is shown in FIG. 5. The spring 3 represents the elasticity provided by the at least one of the binder and the filler, and has a modulus of elasticity of k. The dashpot 4 represents the viscosity provided by the at least one of the binder and the filler, and has a coefficient of viscosity of η.

The equation of motion of the mass ball 1 which is shown in FIG. 1 is given by the following equation (2):

$$m\frac{d^2x}{dt^2} + \eta\frac{dx}{dt} + kx = F(t) \quad (2)$$

where F(t) represents a force that is applied to the mass ball 1. The angular frequency of the mass ball 1 is defined as ω, and the displacement x of the mass ball 1 is defined by x=α sin(ωt). When ω and α are substituted into the equation (2), the following equation (3) is obtained:

$$m\frac{d^2}{dt^2}\{\alpha\sin(\omega t)\} + \eta\frac{d}{dt}\{\alpha\sin(\omega t)\} + k\{\alpha\sin(\omega t)\} = F(t) \quad (3)$$

$$-m\alpha\omega^2\sin(\omega t) + \eta\alpha\omega\cos(\omega t) + k\alpha\sin(\omega t) = F(t)$$

$$\frac{\eta}{m}\alpha\omega\cos(\omega t) + \left(\frac{k}{m} - \omega^2\right)\alpha\sin(\omega t) = \frac{F(t)}{m}$$

With $$\gamma = \frac{\eta}{2m},\ \omega_0 = \sqrt{\frac{k}{m}},$$

the equation (3) is transformed into the following equation:

$$2\gamma\alpha\omega\cos(\omega t) + (\omega_0^2 - \omega^2)\alpha\sin(\omega t) = \frac{F(t)}{m}$$

A synthesis of the trigonometric function results in the following equation:

$$\frac{F(t)}{m} = \alpha\sqrt{(\omega_0^2 - \omega^2)^2 + 4\omega^2\gamma^2}\ \sin(\omega t + \delta)$$

$$\left(\sin\delta = \frac{2\omega\gamma}{\sqrt{(\omega_0^2 - \omega^2)^2 + 4\omega^2\gamma^2}},\ \cos\delta = \frac{\omega_0^2 - \omega^2}{\sqrt{(\omega_0^2 - \omega^2)^2 + 4\omega^2\gamma^2}}\right)$$

Consequently, tan δ is given by the following equation:

$$\tan\delta = \frac{\sin\delta}{\cos\delta} = \frac{2\omega\gamma}{\omega_0^2 - \omega^2}$$

In the evaluation of the viscoelasticity of polymers, in particular, tan δ is represented by the following equation, which gives the ratio between the storage elastic modulus E', which corresponds to the elasticity, and the loss elastic modulus E" which corresponds to the viscosity:

$$\tan\delta = \frac{E''}{E'}$$

As the value of δ which is obtained from tan δ which is given above is greater, the conformability of the friction surface of the frictionally rubbing member to the friction surface of the frictionally rubbed member is poorer, which increases variations in the friction force between the frictionally rubbing member and the frictionally rubbed member. Thus, improving the conformability between the friction surfaces (that is, reducing the value of tan δ) can suppress variations in the friction force, which can suppress noise and vibration that is produced in the entire friction couple.

In the friction couple according to the embodiment, the maximum value tan δ(Max) and the minimum value tan δ(Min) of the loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming have a relationship tan δ(Max)/tan δ(Min)≤5 (equation (1)). In the case where the value of tan δ(Max)/tan δ(Min) is more than 5, that is, in the case where the frequency dependency of the loss tangent tan δ is high, it may be impossible to sufficiently suppress variations in the friction force that are discussed above. The dynamic viscoelastic measurement may be performed in a method that is standardized by JIS K7244-10, for example. The value of tan δ(Max)/tan δ(Min) is preferably 2 or less.

In the friction couple according to the embodiment, the frictionally rubbing member contains at least one of a binder and a filler that satisfies the following three conditions: (1) having a modulus of elasticity of 1 GPa or higher and 15 GPa or lower; (2) having no softening point or no glass transition point in the range of −50° C. or higher and 200° C. or lower; and (3) having a compressive strength of 50 MPa or higher at 25° C. and 25 MPa or higher at 200° C. The above three conditions are described below in detail.

In the case where the at least one of the binder and the filler in the frictionally rubbing member has a modulus of elasticity of 1 GPa or higher and 15 GPa or lower, the frictionally rubbing member can absorb variations in the friction force in minute regions that are produced by the friction, which can suppress generation of vibration in the initial stage of generation of the friction force. In the case where the modulus of elasticity is lower than 1 GPa, the frictionally rubbing member may not be able to keep the elasticity necessary to absorb variations in the friction force in minute regions that are produced by the friction. In the case where the modulus of elasticity is higher than 15 GPa, meanwhile, the friction surface of the frictionally rubbing member may not be able to keep its conformability to the friction surface of the frictionally rubbed member, which may make it impossible to suppress generation of vibration in the initial stage of generation of a friction force. The modulus of elasticity is preferably 2 GPa or higher and 15 GPa or lower, particularly preferably 3 GPa or higher and 15 GPa or lower.

In the case where the at least one of the binder and the filler in the frictionally rubbing member has no softening point or no glass transition point in the range of −50° C. or higher and 200° C. or lower, the at least one of the binder and the filler in the frictionally rubbing member is prevented from being modified from an amorphous state into a rubber state during friction. This allows the formation of a stable friction surface.

In the case where the at least one of the binder and the filler in the frictionally rubbing member has a compressive strength of 50 MPa or higher at 25° C. and 25 MPa or higher at 200° C., the at least one of the binder and the filler has a moderate compressive strength at room temperature, and half the compressive strength at room temperature or higher even at 200° C. This allows the formation of a friction surface that is stable before, during, and after friction. The compressive strength is preferably 100 MPa or higher at 25° C. and 50 MPa or higher at 200° C., particularly preferably 200 MPa or higher at 25° C. and 100 MPa or higher at 200° C.

Specific materials that are used to form the frictionally rubbing member according to the embodiment are discussed below. The frictionally rubbing member according to the embodiment is made of a composite material that is made from a dozen or so kinds of raw materials in which a friction/wear modifier is added to a basic material using an organic polymer as a binder. Specifically, the frictionally rubbing member contains a basic material which may be aramid fiber, steel fiber, and nonferrous fiber, and a sliding member which may be an organic filler such as cashew dust, an inorganic filler such as barium sulfate and calcium carbonate, metal powder such as copper powder and brass powder, and a solid lubricant such as graphite and molybdenum disulfide as a modifier for friction, wear, and rust.

The basic material is preferably a material that is not easily deformed by heat. Specific examples of the basic material include organic fiber such aramid fiber, nylons, and celluloses, and inorganic fiber such as steel fiber, copper fiber, ceramic fiber, glass fiber, and rock wool. The proportion of the basic material to the frictionally rubbing member is preferably 5 to 50% by volume.

Examples of the filler as a component of the sliding member include organic fillers such as aramid, cashew dust, and rubber particles, inorganic fillers such as carbon, ceramic fiber, barium sulfate, and calcium carbonate, metal powder such as copper powder and brass powder, oxide fillers such as iron oxide and ceramics, and solid lubricants such as graphite and molybdenum disulfide. The proportion of the filler to the frictionally rubbing member is preferably 10% or more by volume.

Examples of the binder as a component of the sliding member include cashew resins, melamine resins, and synthetic rubbers. The proportion of the binder to the frictionally rubbing member is preferably 10% or more by volume.

In order for the three conditions which are discussed above to be satisfied, the at least one of the binder and the filler is preferably selected from a polyamide-imide resin, a polyimide resin, a polyethersulfone resin, a polyetherimide resin, a polyphenylene oxide resin, a polyaminobismaleimide resin, and a polybenzimidazole resin. In the case where the frictionally rubbing member according to the embodiment contains at least one of a polyamide-imide resin, a polyimide resin, a polyethersulfone resin, a polyetherimide resin, a polyphenylene oxide resin, a polyaminobismaleimide resin, and a polybenzimidazole resin which are thermoplastic resins, it is possible to obtain the effect of suppressing noise and vibration.

In regulating the filler or the binder, the materials which are discussed above, for example, may be mixed in a conventionally known method. Examples of the mixing method include dry mixing using a mixer such as a vertical mixer or a horizontal mixer, and wet mixing that is performed using the above mixer in the presence of water or an organic solvent which is followed by vacuum degassing or heat degassing. Examples of the method for forming the frictionally rubbing member include placing the mixture which is obtained by the above mixing method in a mold to apply a pressure to the mixture, and bonding the mixture which is obtained by the above mixing method to the basic material. The frictionally rubbing member may be processed to have the shape of a line, a bar, a plate, or a sheet, or any other shape depending on the selection of the form of the basic material.

In the frictionally rubbing member according to the embodiment, the basic material which is discussed above and the binder and/or the filler that satisfy the three conditions which are discussed above are preferably arranged alternately at least two-dimensionally, more preferably three-dimensionally. The basic material and the binder and/or the filler may be arranged irregularly. Specific examples of the above alternate arrangement include an arrangement in which particles of the binder and the filler are arranged in gaps between particles of the basic material which are arranged in a grid, an arrangement in which particles of the basic material and the filler are arranged in gaps between particles of the binder which are arranged in a grid, an arrangement in which particles of the basic material and the binder are arranged in gaps between particles of the filler which are arranged in a grid, an arrangement in which particles of the basic material, the binder, and the filler are arranged alternately in a stripe, an arrangement in which particles of the basic material are surrounded by particles of the binder and the filler, an arrangement in which particles of the binder are surrounded by particles of the basic material and the filler, and an arrangement in which particles of the filler are surrounded by particles of the basic material and the binder. In the case where particulate substances which may be or may not be the basic material, the binder, and the filler are used, respective particles of different substances may be arranged alternately, or respective layers of different substances may be arranged alternately. In the case where the basic material, the binder, and the filler are arranged alternately, the length or thickness of the basic material, binder, and filler layers is preferably 0.1 to 500 μm.

FIG. 1 is a schematic cross-sectional view that shows a friction couple according to an embodiment of the present invention. A friction couple 100 according to the embodiment includes a frictionally rubbing member 11 and a frictionally rubbed member 12. When the frictionally rubbing member 11 and the frictionally rubbed member 12 are combined with each other, the friction surface of the frictionally rubbing member 11 and the friction surface of the frictionally rubbed member 12 contact each other. In the frictionally rubbing member 11, particles of a material 13 which is at least one of the binder and the filler which satisfies the three conditions which are discussed above are arranged in a grid, and particles of a different material 14 fills gaps between the particles of the material 13. In the frictionally rubbing member as a whole, the maximum value tan δ(Max) and the minimum value tan δ(Min) of the loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming satisfy the relationship defined by the above equation (1). The different material 14 is assumed to be a material with a high friction coefficient.

Figure 2A:
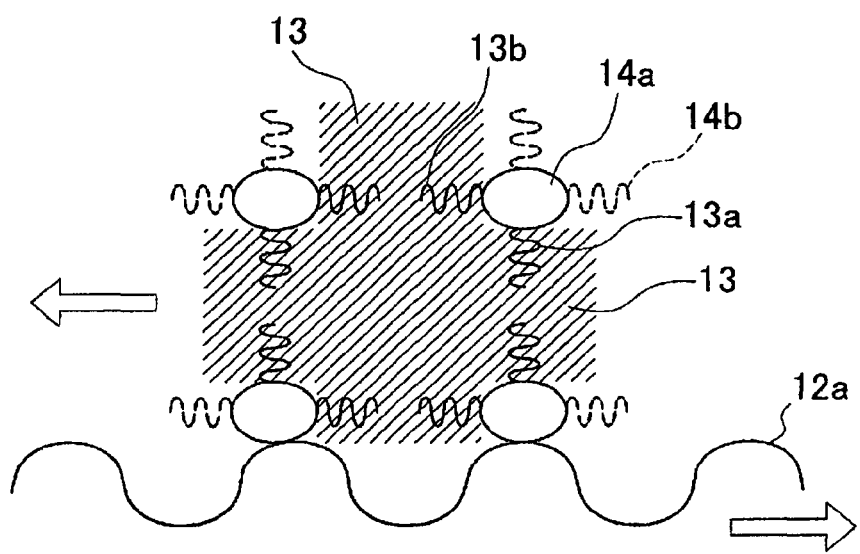
FIGS. 2A and 2B are each an enlarged schematic cross-sectional view that shows the vicinity of friction surfaces in the friction couple according to the embodiment of the present invention.
Figure 2B:
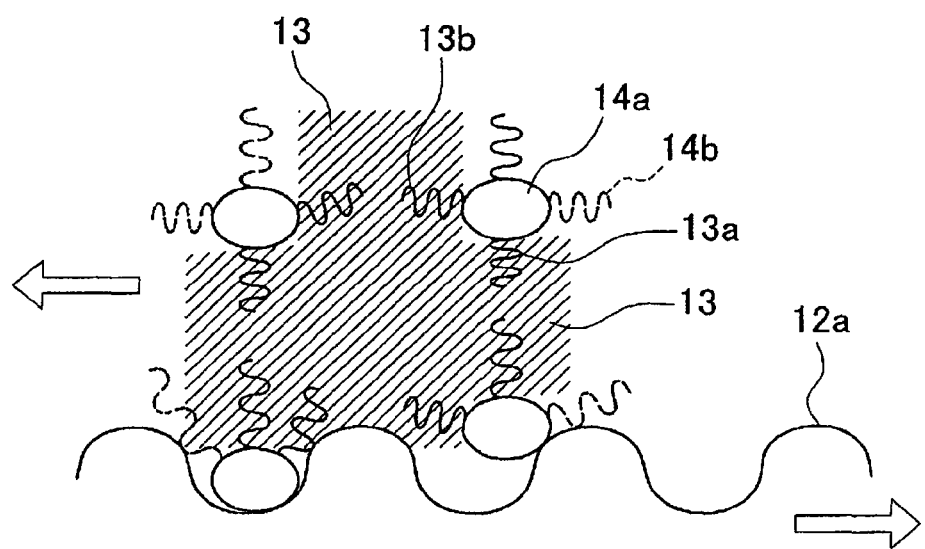

FIG. 2 is an enlarged schematic cross-sectional view that shows the vicinity of the friction surfaces in the friction couple according to the embodiment which is shown in FIG. 1. The viscoelasticity of the material 13 with respect to the different material 14 is schematically indicated as springs 13a and 13b that are depicted in the solid line. The different material 14 contains hard particles 14a with a high friction coefficient. Springs 14b that are depicted in the dotted line schematically indicate the viscoelasticity between the hard particles 14a within the different material 14. FIGS. 2A and 2B respectively show a state before and after the friction surface of the frictionally rubbing member moves leftward with respect to the friction surface 12a of the frictionally rubbed member while causing friction.

As shown in FIGS. 2A and 2B, the hard particles 14a in the frictionally rubbing member move along the recesses and projections on the friction surface of the frictionally rubbed member as friction occurs, which produces distortion in the frictionally rubbing member as a whole. Since the material 13a satisfies the three conditions which are discussed above and the frictionally rubbing member as a whole satisfies the above equation (1), however, the conformability of the friction surface of the frictionally rubbing member to the friction surface of the frictionally rubbed member is high. This allows the formation of a friction surface that can suppress generation of vibration in the initial stage of generation of a friction force and hence that can suppress noise and vibration.

In the friction couple according to the embodiment, the frictionally rubbing member preferably provides a vibration absorption margin that absorbs vibration in a generally vertical direction with respect to the friction surface of the frictionally rubbing member (the margin of expansion and contraction of the spring 13a in a generally vertical direction with respect to the friction surface of the frictionally rubbing member which is shown in FIGS. 2A and 2B) that is equal to or more than a length corresponding to the surface roughness of the friction surface of the frictionally rubbed member. This allows the material 13 to absorb vibration of the friction surface of the frictionally rubbing member with respect to the friction surface of the frictionally rubbed member in a generally vertical direction, which can secure the conformability of the friction surface of the frictionally rubbing member to the friction surface of the frictionally rubbed member. If the vibration absorption margin is less than the length corresponding to the surface roughness of the friction surface of the frictionally rubbed member, the spring in a generally vertical direction may be fully expanded or contracted while the hard particles 14a are still moving along the recesses and projections on the friction surface of the frictionally rubbed member, which may make it impossible to secure the conformability.

In the friction couple according to the embodiment, the frictionally rubbing member preferably provides the vibration absorption margin that absorbs vibration in a generally horizontal direction with respect to the friction surface of the frictionally rubbing member (the margin of expansion and contraction of the spring 13b in a generally horizontal direction with respect to the friction surface of the frictionally rubbing member which is shown in FIGS. 2A and 2B) that is equal to or more than the amount of deformation of the frictionally rubbing member that occurs when a shearing force in a generally horizontal direction is applied to the frictionally rubbing member. This allows the material 13 to absorb vibration of the friction surface of the frictionally rubbing member with respect to the friction surface of the frictionally rubbed member in a generally horizontal direction, which can secure the conformability of the friction surface of the frictionally rubbing member to the friction surface of the frictionally rubbed member. If the vibration absorption margin is less than the amount of deformation, the spring in a generally horizontal direction may be fully expanded or contracted while the hard particles 14a are still moving along the recesses and projections on the friction surface of the frictionally rubbed member, which may make it impossible to secure the conformability.

In the friction couple according to the embodiment, it is preferable, as shown in FIGS. 2A and 2B, that the frictionally rubbing member further contains hard particles, and that when a force in a generally vertical direction with respect to the friction surface of the frictionally rubbing member is applied to the hard particles, the frictionally rubbing member provides a vibration absorption margin that absorbs vibration that is equal to or more than a length corresponding to the surface roughness of the friction surface of the frictionally rubbed member. This allows the material 13 to absorb vibration of the friction surface of the frictionally rubbing member in a generally vertical direction with respect to the friction surface of the frictionally rubbed member that is applied to the hard particles, which can secure the conformability of the friction surface of the frictionally rubbing member to the friction surface of the frictionally rubbed member.

In FIGS. 2A and 2B, the material 13 preferably has a layer thickness of 0.1 to 100 µm, particularly preferably 5 to 20 µm. The hard particles 14a preferably have an average diameter of 0.1 to 500 µm in the case where they are in the particulate form as shown in FIGS. 2A and 2B, and preferably have a total length of 5 mm or shorter as well as the above average diameter in the case where they are in the fiber form. The vibration absorption margin which is discussed above is preferably 0.5 to 100 µm, particularly preferably 3 to 10 µm, irrespective of whether in a generally vertical direction or in a generally horizontal direction.

Figure 3:
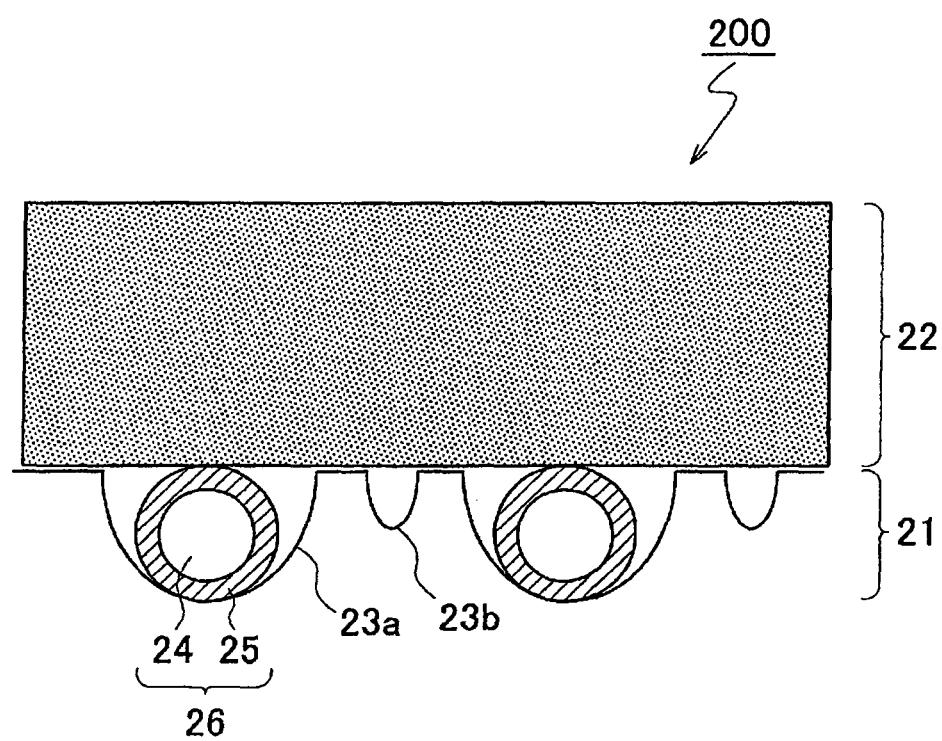
FIG. 3 is a schematic cross-sectional view that shows a friction couple according to a modification of the present invention.

FIG. 3 is a schematic cross-sectional view that shows a friction couple according to a modification of the present invention. A friction couple 200 according to the modification includes a frictionally rubbing member 21 and a frictionally rubbed member 22. When the frictionally rubbing member 21 and the frictionally rubbed member 22 are combined with each other, the friction surface of the frictionally rubbing member 21 and the friction surface of the frictionally rubbed member 22 contact each other. Recesses 23a and 23b of various sizes are formed in the friction surface of the frictionally rubbing member 21. The recesses 23a have a diameter of 0.2 to 1000 µm and a depth of 1 to 500 µm. A substance 26 obtained by coating a material 24 that is at least one of an inorganic material and a metallic material with a material 25 that is at least one of the binder and the filler is provided in the recesses 23a.

The material 24 is at least one of an inorganic material and a metallic material selected from copper oxide, apatite ($3Ca_3P_2O_8CaF$), soda glass ($xNaO.yCaO.zSiO_2$), magnesium oxide, chromium oxide, hematite ($Fe_2O_3$), feldspar ($CaAl_2Si_2O_8$), magnetite ($Fe_3O_4$), orthoclase ($KSi_3AlO_8$), titanium oxide, zirconium oxide, quartz ($SiO_2$), zircon ($ZrSiO_4$), garnet ($CaAl_2(SiO_4)_2$), topaz ($Al_2F_2SiO_2$), alumina, titanium carbide (TiC), tungsten carbide (WC), boron carbide ($B_4C$), silicon carbide (SiC), cubic boron nitride (BN), diamond, and so forth, and is in the form of particles with a diameter of 0.1 to 500 µm. The material 25 satisfies the three conditions which are discussed above regarding the modulus of elasticity, the softening point and the glass transition point, and the compressive strength, and covers the material 24 with a thickness 0.1 to 500 µm. In the frictionally rubbing member 21 as a whole, the maximum value tan δ(Max) and the minimum value tan δ(Min) of the loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming satisfy the relationship defined by the above equation (1). The material 24 may be or may not necessarily be provided in the recesses 23b which are smaller in diameter and depth than the recesses 23a.

Figure 4:
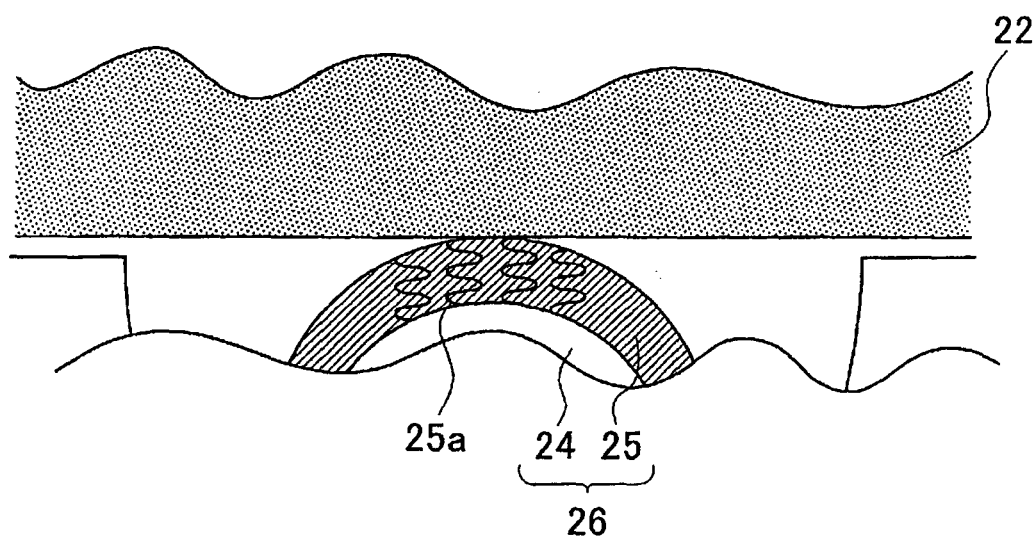
FIG. 4 is an enlarged schematic cross-sectional view that shows the vicinity of friction surfaces in the friction couple according to the modification of the present invention.

FIG. 4 is an enlarged schematic cross-sectional view that shows the vicinity of the friction surfaces in the friction couple according to the modification of the present invention which is shown in FIG. 3. Springs 25a that are depicted in the solid line in FIG. 4 schematically indicate the viscoelasticity of the material 25 with respect to the frictionally rubbed member 22. If only the material 24 which has a high friction coefficient were provided in a recess, the friction couple would exhibit a high friction force, but would produce noise and vibration in the recess as friction occurred. Meanwhile, as shown in FIG. 4, the substance 26 in the frictionally rubbing member is obtained by covering the material 24 with the material 25. The material 25 satisfies the three conditions which are discussed above, and the frictionally rubbing member as a whole satisfies the above equation (1). This allows the material 25 to absorb vibration of the material 24 in the recess, which can suppress generation of noise and vibration.

According to the embodiment, as indicated by the equation (1), the frequency dependency of the loss tangent tan δ of the frictionally rubbing member is low, which makes the conformability of the friction surface of the frictionally rubbing member to the friction surface of the frictionally rubbed member high. It is thus possible to suppress generation of vibration in the initial stage of generation of a friction force. According to the embodiment, also, the frictionally rubbing member contains at least one of a binder and a filler that has an appropriate modulus of elasticity, and therefore can absorb variations in the friction force in minute regions that are produced by the friction, which can suppress generation of vibration in the initial stage of generation of the friction force. According to the embodiment, further, the frictionally rubbing member contains at least one of a binder and a filler that has no softening point or no glass transition point in a certain temperature range, and therefore the at least one of the binder and the filler in the frictionally rubbing member is not modified from an amorphous state into a rubber state during friction. This allows the formation of a stable friction surface. According to the embodiment, moreover, the at least one of the binder and the filler has a moderate compressive strength at room temperature, and also has half the compressive strength at room temperature or higher even at 200° C. This allows the formation of a friction surface that is stable before, during, and after friction. According to the embodiment, furthermore, it is possible to suppress variations in the friction force through the addition of a minimum necessary amount of the binder and/or the filler.

The embodiment is described below on the basis of Example in comparison with Comparative Example. The present invention, is not limited to Example and may be implemented in various ways without departing from the gist thereof. For example, as an embodiment of the present invention, at least one of the binder and the filler which is specified in the embodiment may be provided all over the friction surface of the frictionally rubbing member which contacts the frictionally rubbed member, or may be exposed over a part of the friction surface of the frictionally rubbing member which contacts the frictionally rubbed member.

1. Fabrication of Friction Couple

Example

A frictionally rubbing member (brake pad) which is a constituent element of a friction couple according to Example was fabricated by mixing respective materials which are shown in Table 1 below in corresponding compounding amounts (vol %) indicated in the Example column of Table 1. The production method is described below in detail. First, the various raw materials were mixed to be uniform using an upright mixer for 5 minutes to obtain a frictionally rubbing member raw material mixture. In the next process, the frictionally rubbing member raw material mixture was placed in a mold that has been heated to 300° C., and subjected to thermoforming for 30 minutes under a pressure of 300 kg/cm². This is made possible by the fact that a polyamide-imide resin which was used as a binder has no softening point or no glass transition point in the range of −50° C. or higher and 300° C. or lower, which includes the range of −50° C. or higher and 200° C. or lower. Thereafter, the frictionally rubbing member raw material mixture was cured for 2 hours at 200° C. to obtain a frictionally rubbing member (brake pad). A cast iron rotor (equivalent to FC200) was used as a frictionally rubbed member (disc rotor) which is a constituent element of the friction couple according to the example. The frictionally rubbing member and the frictionally rubbed member were combined with each other to form the friction couple according to embodiment.

Comparative Example

A frictionally rubbing member (brake pad) which is a constituent element of a friction couple according to Comparative Example was fabricated by mixing respective materials which are shown in Table 1 below in corresponding compounding amounts (vol %) indicated in the Comparative Example column of Table 1. The production method is described below in detail. First, the various raw materials were mixed to be uniform using the upright mixer for 5 minutes to obtain a frictionally rubbing member raw material mixture. In the next process, the frictionally rubbing member raw material mixture was placed in a mold that has been heated to 150° C., and subjected to thermoforming for 10 minutes under a pressure of 200 kg/cm$^2$. Because the phenol resin which was used as a binder has a softening point and a glass transition point in the range of 150° C. or higher and 200° C. or lower, pressurization was not performed at a temperature higher than 150° C. Thereafter, the frictionally rubbing member raw material mixture was cured for 2 hours at 200° C. to obtain a frictionally rubbing member (brake pad). A cast iron rotor (equivalent to FC200) was used as a frictionally rubbed member (disc rotor) which is a constituent element of the friction couple according to Comparative Example. The frictionally rubbing member and the frictionally rubbed member were combined with each other to form the friction couple according to Comparative Example.

TABLE 1

| Raw material | Component | Compounding amount (vol %) | |
|---|---|---|---|
| | | Example | Comparative Example |
| Fiber base material | Aramid fiber | 5 | 5 |
| | Ferrous fiber | 10 | 10 |
| | Glass fiber | 10 | 10 |
| Friction modifier and filler | Graphite | 5 | 5 |
| | ZrSiO$_4$ | 10 | 10 |
| | Mica | 10 | 10 |
| | Barium sulfate | 30 | 30 |
| Binder | Polyamide-imide resin | 20 | 0 |
| | Phenol resin | 0 | 20 |
| Total | | 100 | 100 |

2. Measurement of tan δ of Friction Couple

A dynamic viscoelastic measurement was performed on the friction couples according to Example and Comparative Example to obtain the maximum value tan δ(Max) and the minimum value tan δ(Min) of the loss tangent tan δ of the respective frictionally rubbing members which are constituent elements of the friction couples according to Example and Comparative Example. The dynamic viscoelastic measurement was performed in a method that was standardized by JIS K7244-10. Table 2 shows the tan δ(Max) and tan δ(Min) values of the respective frictionally rubbing members according to Example and Comparative Example, the respective measurement conditions under which the tan δ(Max) and tan δ(Min) values were obtained, and the ratio of the tan δ(Max) value to the tan δ(Min) value (tan δ(Max)/tan δ(Min)) of the respective frictionally rubbing members according to Example and Comparative Example.

TABLE 2

| | Example | Comparative Example | Measurement conditions |
|---|---|---|---|
| tan δ(Max) | 0.047 | 0.140 | 0.1 Hz, 250° C. |
| tan δ(Min) | 0.027 | 0.014 | 20 Hz, 0° C. |
| tan δ(Max)/ tan δ(Min) | 1.7 | 10 | |

As shown in Table 2, the tan δ(Max)/tan δ(Min) value of the frictionally rubbing member of the friction couple according to Example was 1.7, which was in the range of 5 or less, while the tan δ(Max)/tan δ(Min) value of the frictionally rubbing member according to Comparative Example was 10, which was more than 5. Thus, it was confirmed that the frequency dependency of the loss tangent tan δ of the frictionally rubbing member according to Example was low, and that the frequency dependency of the loss tangent tan δ of the frictionally rubbing member according to Comparative Example was high.

3. Measurement and Evaluation of Friction Characteristics (Squeaks) of Friction Couple The respective friction couples according to Example and Comparative Example were installed on an automobile to perform a measurement on squeaks that occur during simulated city driving (100 times of braking at a speed of 40 km/h, a deceleration of 0.1 to 1.5 m/s$^2$, and a temperature of 50 to 150° C.). The number and the volume of squeaks were compared. Table 3 shows the comparison results.

TABLE 3

| | Example | Comparative Example |
|---|---|---|
| Number of squeaks | 40 | 100 |
| Volume of squeaks | Middle-small | Large-middle |

As shown in Table 3, it was found that the friction couple according to Example produced a small number of squeaks at a small volume compared to the friction couple according to Comparative Example. From the measurement results, it was found that in the friction couple according to Example, in which the frequency dependency of the loss tangent tan δ of the frictionally rubbing member was low, the conformability of the friction surface of the frictionally rubbing member to the friction surface of the frictionally rubbed member was high, which made it possible to suppress generation of vibration in the initial stage of generation of a friction force and to suppress squeaks due to generation of vibration.

The invention claimed is:
1. A friction couple comprising:
a frictionally rubbing member that includes a first material, which includes a binder and a filler, and a second material, which includes a basic material, wherein at least one of the binder and the filler of the first material has a modulus of elasticity of 1 GPa or higher and 15 GPa or lower, no softening point or no glass transition point in the range of −50° C. or higher and 200° C. or lower, and a compressive strength of 50 MPa or higher at 25° C. and 25 MPa or higher at 200° C.; and a frictionally rubbed member, wherein a friction surface of the frictionally rubbing member and a friction surface of the frictionally rubbed member contact each other when the frictionally rubbing member and the frictionally rubbed member are combined with each other, wherein a maximum value tan δ(Max) and a minimum value tan δ(Min) of a loss tangent tan δ of the frictionally rubbing member obtained through a dynamic viscoelastic measurement performed at a frequency of 0.1 Hz or higher and 20 Hz or lower and in the range of −50° C. or higher and 250° C. or lower after thermoforming have a relationship tan δ(Max)/tan δ(Min)≤5, and the first and second materials of the frictionally rubbing member are arranged alternately in a periodic structure so that the friction surface that contacts the frictionally rubbed member includes both of the first and second materials.

2. The friction couple according to claim 1, wherein the first material includes at least one of a polyamide-imide resin, a polyimide resin, a polyethersulfone resin, a polyetherimide resin, a polyphenylene oxide resin, a polyaminobismaleimide resin, and a polybenzimidazole resin.

3. The friction couple according to claim 1, wherein the frictionally rubbing member provides a vibration absorption margin that absorbs vibration in a generally vertical direction with respect to the friction surface of the frictionally rubbing member that is equal to or more than a length corresponding to a surface roughness of the friction surface of the frictionally rubbed member.

4. The friction couple according to claim 3, wherein the vibration absorption margin is 0.5 to 100 μm.

5. The friction couple according to claim 1, wherein the frictionally rubbing member provides a vibration absorption margin that absorbs vibration in a generally horizontal direction with respect to the friction surface of the frictionally rubbing member that is equal to or more than an amount of deformation of the frictionally rubbing member that occurs when a shearing force in a generally horizontal direction is applied to the frictionally rubbing member.

6. The friction couple as in claims 1, 2, 3 or 5, wherein the second material includes hard particles, and when a force in a generally vertical direction with respect to the friction surface of the frictionally rubbing member is applied to the hard particles, the frictionally rubbing member provides a vibration absorption margin that absorbs vibration that is equal to or more than a length corresponding to a surface roughness of the friction surface of the frictionally rubbed member.

7. The friction couple according to claim 1, wherein a recess is formed in at least one of the respective friction surfaces of the frictionally rubbing member and the frictionally rubbed member, and a third material including at least one of an inorganic material and a metallic material that is coated with at least one of the binder and the filler is provided in the recess.

8. The friction couple according to claim 1, wherein the periodic structure forms a grid, such that a grid of the first material separates portions of the second material in the frictionally rubbing member.

9. The friction couple according to claim 1, wherein the periodic structure forms a grid, such that portions of the second material fill gaps between portions of the first material.

10. The friction couple according to claim 1, wherein the binder includes polyamide-imide resin, the filler includes graphite, $ZrSiO_4$, mica, and barium sulfate, and the base material includes aramid fiber, ferrous fiber and glass fiber.

* * * * *